United States Patent [19]
Cohen

[11] Patent Number: 6,007,167
[45] Date of Patent: Dec. 28, 1999

[54] COMPACT DISK STORAGE CABINET

[75] Inventor: Gary M. Cohen, Syosset, N.Y.

[73] Assignee: Manifestation, L.L.C., Syosset, N.Y.

[21] Appl. No.: 08/924,545

[22] Filed: Aug. 27, 1997

[51] Int. Cl.⁶ .................................................. A47B 81/06
[52] U.S. Cl. ..................... 312/9.48; 312/108; 211/194; 211/40; 220/23.86; 206/387.15
[58] Field of Search ........................... 206/387.1, 387.14, 206/308.1, 386.15; 220/4.27, 4.26, 23.83, 23.86, 23.6; 312/108, 111, 107, 9.47, 9.48, 9.53, 9.63; 211/40, 188, 194

[56] References Cited

U.S. PATENT DOCUMENTS

| | | | |
|---|---|---|---|
| 3,873,220 | 3/1975 | Kashiwabara | 403/292 |
| 4,485,930 | 12/1984 | Salekouls | 211/194 |
| 5,458,238 | 10/1995 | Dominguez-Gutierrez | 206/387.14 |

FOREIGN PATENT DOCUMENTS

| | | | |
|---|---|---|---|
| 0410035 | 1/1991 | European Pat. Off. | 312/265.5 |
| 2156641 | 11/1993 | Germany | 312/107 |
| 2271051 | 4/1994 | United Kingdom | 312/108 |

*Primary Examiner*—Peter M. Cuomo
*Assistant Examiner*—Gerald A. Anderson
*Attorney, Agent, or Firm*—Lloyd L. Zickert

[57] ABSTRACT

A modular storage cabinet for compact disk jewel boxes that includes a plurality of connectible members to construct a cabinet of a desired architecture or configuration of choice. The cabinet of the invention will be provided to the user in disassembled form wherein the various parts or members can be assembled into a configuration of choice to hold a desired number of compact disk jewel boxes including both single and double boxes. The members include side, back, top, bottom and expander members for constructing an enclosure having a front opening into which jewel boxes may be inserted and withdrawn wherein the structure is in the form of a tower.

30 Claims, 8 Drawing Sheets

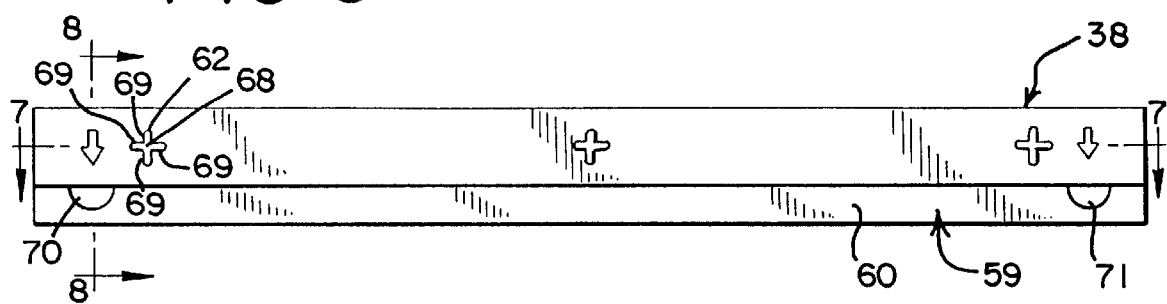
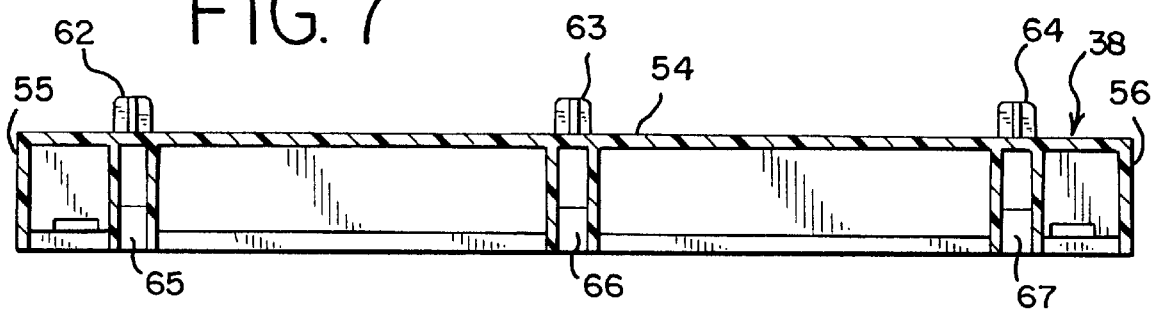
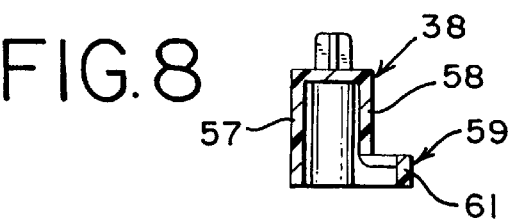
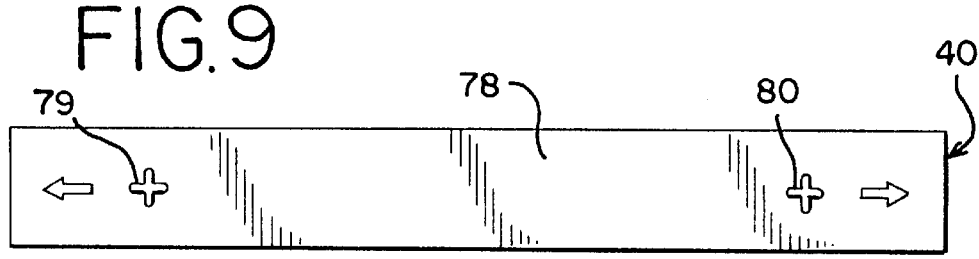
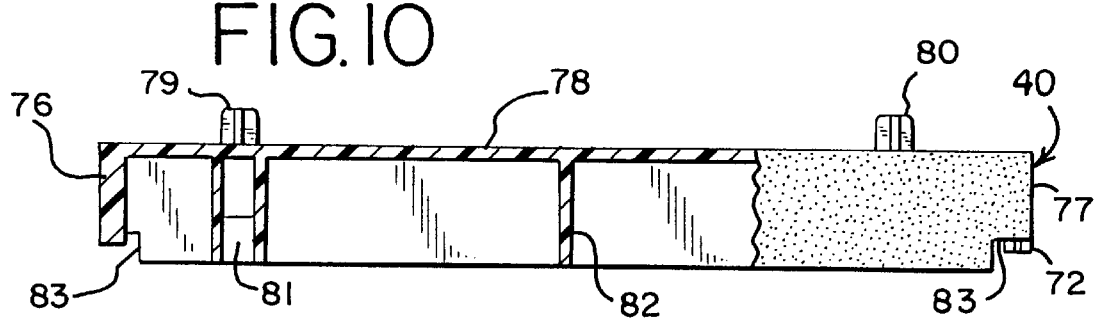

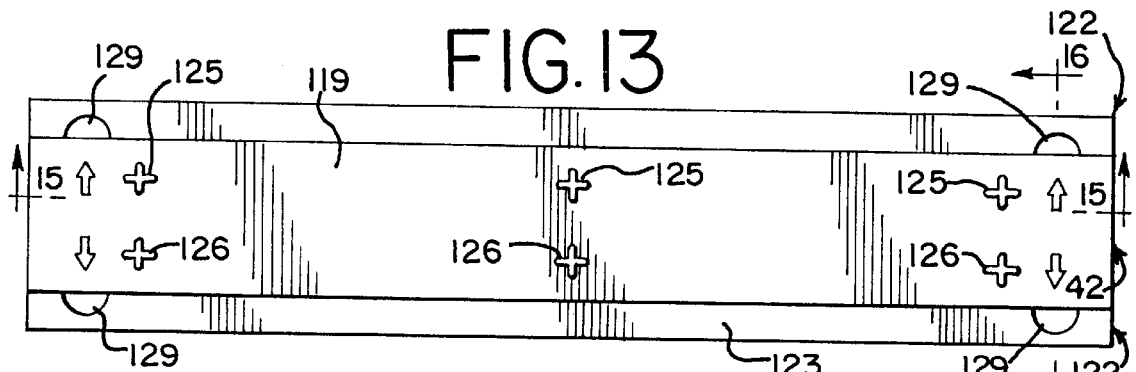
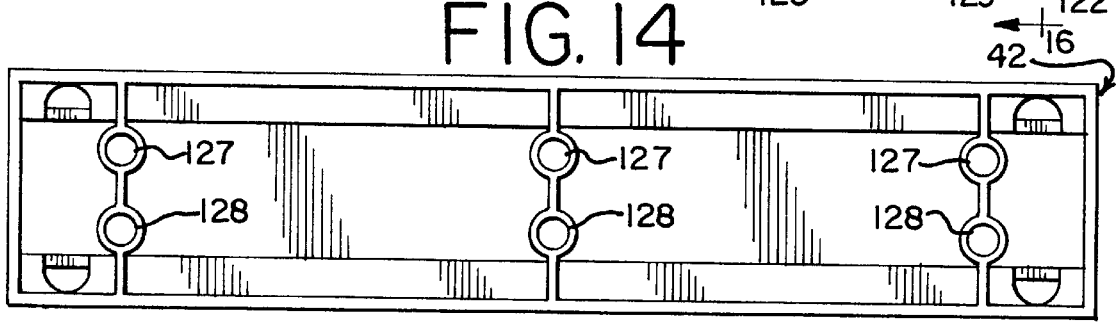
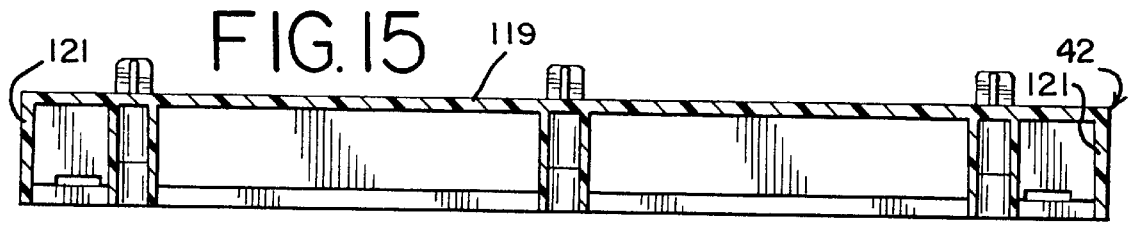
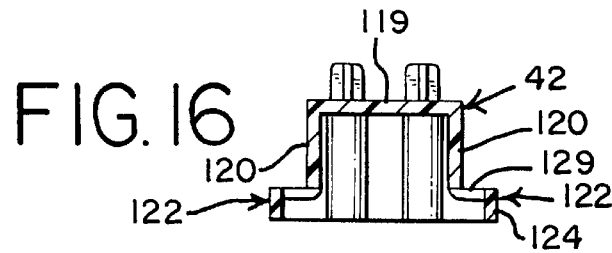
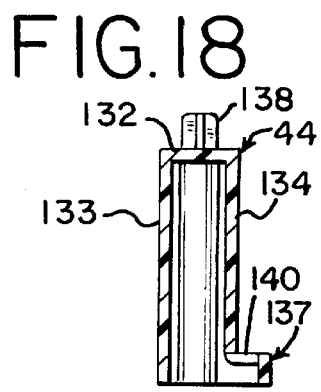
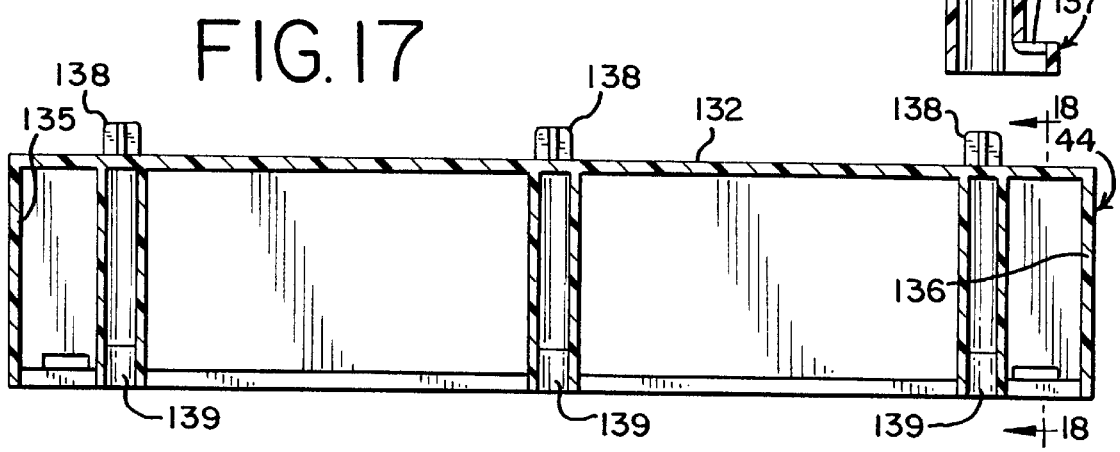

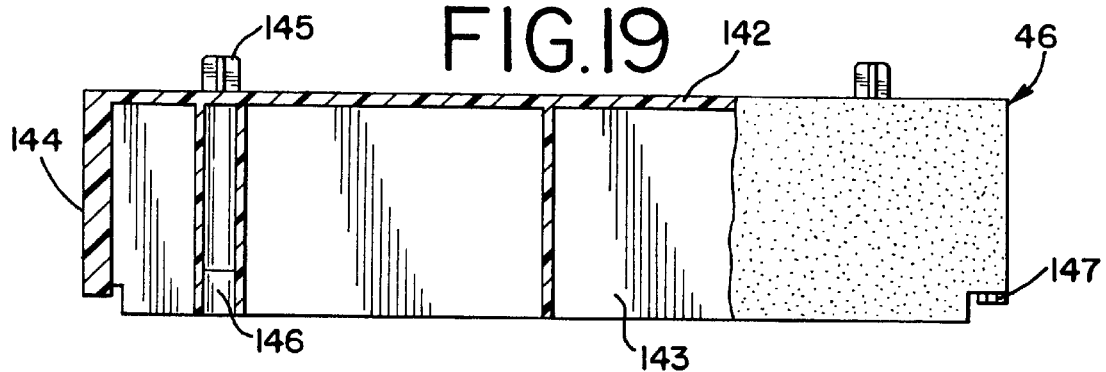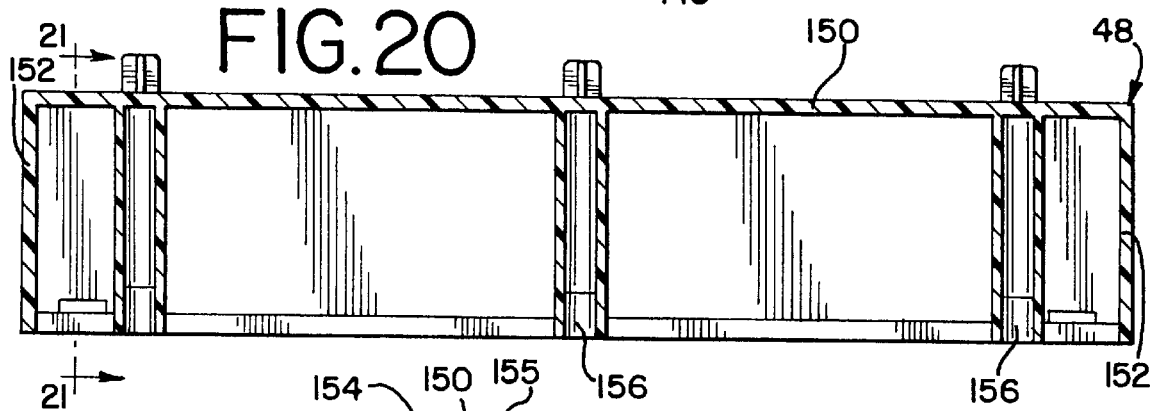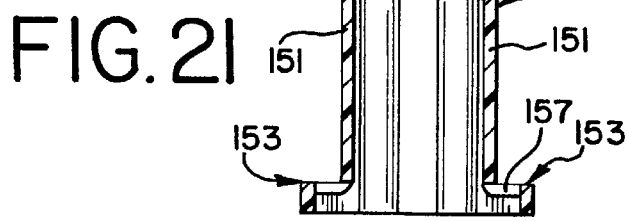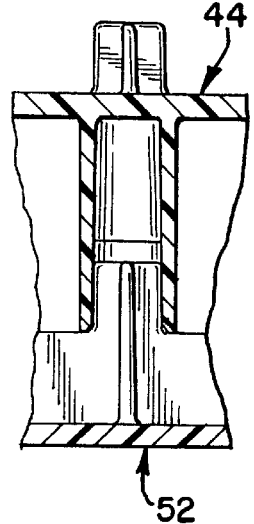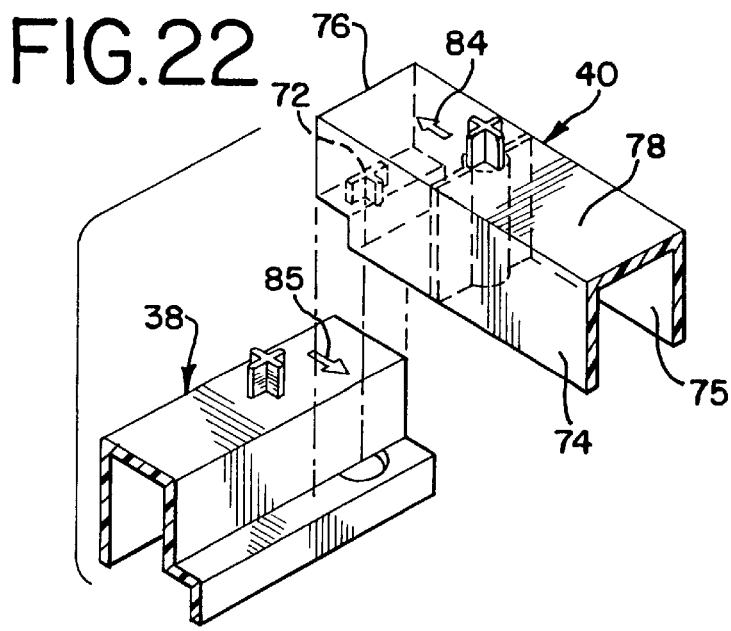

COMPACT DISK STORAGE CABINET

DESCRIPTION

The present invention relates to a modular cabinet or enclosure for the storage of compact disk jewel boxes, and more particularly to a cabinet made up of a plurality of members that may be configured when assembled to a structure of choice for holding a plurality of compact disk jewel boxes.

BACKGROUND OF THE INVENTION

The use of compact disks (CDs) for the recording and playing of music and other data has become widespread. It is not uncommon for a person either in his home or at a business to accumulate dozens and even hundreds of CDs over a period of time. The CDs are always kept in a plastic jewel box, which is a container for protecting the CD against damage. The jewel boxes usually receive only a single CD, but there are many jewel boxes that will receive a pair of CDs, and those jewel boxes may be referred to as double jewel boxes.

The accumulation of a large number of CDs presents the problem of handling and storage and particularly storing so that they are readily available for use. A variety of different storage cabinets or enclosures have been provided heretofore for storage of CDs. However, those storage devices have all been of the type that are made up in advance to hold a predetermined number of CDs, and also where the structure is preconfigured.

SUMMARY OF THE INVENTION

The modular cabinet of the present invention is capable of being configured by the user into a desired architecture to fit the user's needs. Accordingly, the cabinet includes a number of parts that can be assembled to define a particular structure.

More specifically, the modular cabinet of the invention includes side, back, top, bottom, and expander members having means for interconnecting the members so that the user can create a cabinet that will fit into a particular space and also be of a size to store the number of CDs owned by the user. These members are molded of a suitable plastic by injection molding techniques. For connecting the members together, each of the members includes pins and/or sockets that are interfitting so that the pins may be press-fit into the sockets. The height of the side, back and expander members is either suitable for a single CD or double CDs. The exterior of all of the members is textured to provide a highly aesthetic structure when it is completed. Additionally, the side and back members have coacting means for locking them together at right angles to each other. The side members include rails on the inner walls in order to support the opposite edges of a CD jewel box. The front of the cabinet, once it is constructed, is open so that identification of the CDs can readily be made as they are stored in the cabinet.

The members are molded of a suitable plastic such as a polystyrene. It will be appreciated that other types of suitable plastics may be used other than polystyrene. Inasmuch as the outer surfaces of the members are all textured when the various members are assembled, they will have a similar outside appearance. Any suitable color of plastic may be used.

Moreover, the modular object of the cabinet is such that a person will have unlimited storage capacity for CDs. Additional structures can be added at any time to a first structure. Further, the architectural structures may be expanded vertically or laterally to go over or under another member or structure, or even around anything. While the modular cabinet is generally intended to be used for storing the CDs horizontally, it can be arranged to store them vertically if desired. Thus, the configuration initially made by user can be changed or expanded even so much as to add or subtract storage for one CD in any direction.

It should be further appreciated that the members of the modular cabinet of the invention could be sized such that the cabinet could receive and hold video cassettes, audio cassettes, computer backup tapes, or any plastic-cased information storage devices.

It is therefore an object of the present invention to provide a new and improved cabinet for the storage of plastic-cased information storage devices.

A further object of the present invention is to provide a modular cabinet for the storage of CDs which includes a plurality of members that may be assembled into a desired architecture and configuration for storing a desired number of CDs.

A still further object of the present invention is in the provision of a new and improved modular cabinet for the storage of CDs wherein a plurality of members may be assembled to form one or more towers, each of which would be capable of storing a predetermined number of CDs.

A still further object of the present invention is in the provision of a modular storage cabinet for CDs that may be easily assembled into a particular configuration and which will provide a desired storage facility for the CDs and which can be economically manufactured while providing a rigid structure that will safely store the CDs.

Other objects, features and advantages of the invention will be apparent from the following detailed disclosure, taken in conjunction with the accompanying sheets of drawings, wherein like reference numerals refer to like parts.

DESCRIPTION OF THE DRAWINGS

FIG. 6 is a top plan view of a single side member that would be usable for storing a single CD in a jewel box;

FIG. 7 is a longitudinal sectional view taken substantially along line 7—7 of FIG. 6;

FIG. 8 is a transverse sectional view taken substantially along line 8—8 of FIG. 6;

FIG. 9 is a top plan view of a single back member;

FIG. 10 is a side elevational view of the back member of FIG. 9 with some parts shown in section to show underlying parts;

FIG. 13 is a top plan view of a single expander member according to the present invention;

FIG. 14 is a bottom plan view of the expander member of FIG. 13;

FIG. 15 is a longitudinal sectional view taken substantially along line 15—15 of FIG. 13;

FIG. 16 is a transverse sectional view taken substantially along line 16—16 of FIG. 13;

FIG. 17 is a longitudinal sectional view of a double side member for use in storing double CDs;

FIG. 18 is a transverse sectional view taken substantially along line 18—18 of FIG. 17;

FIG. 19 is an elevational view and partly sectional view of a double back member according to the present invention;

FIG. 20 is a longitudinal sectional view taken through a double expander member according to the present invention;

FIG. 21 is a vertical sectional view taken substantially along line 21—21 of FIG. 20;

FIG. 22 is an enlarged exploded and partially fragmentary view of a back member and a side member to illustrate the manner in which the two members are connected together and locked in place; and FIG. 23 is a fragmentary sectional view of a pin and socket in assembled relation.

DESCRIPTION OF THE INVENTION

Figure 1:
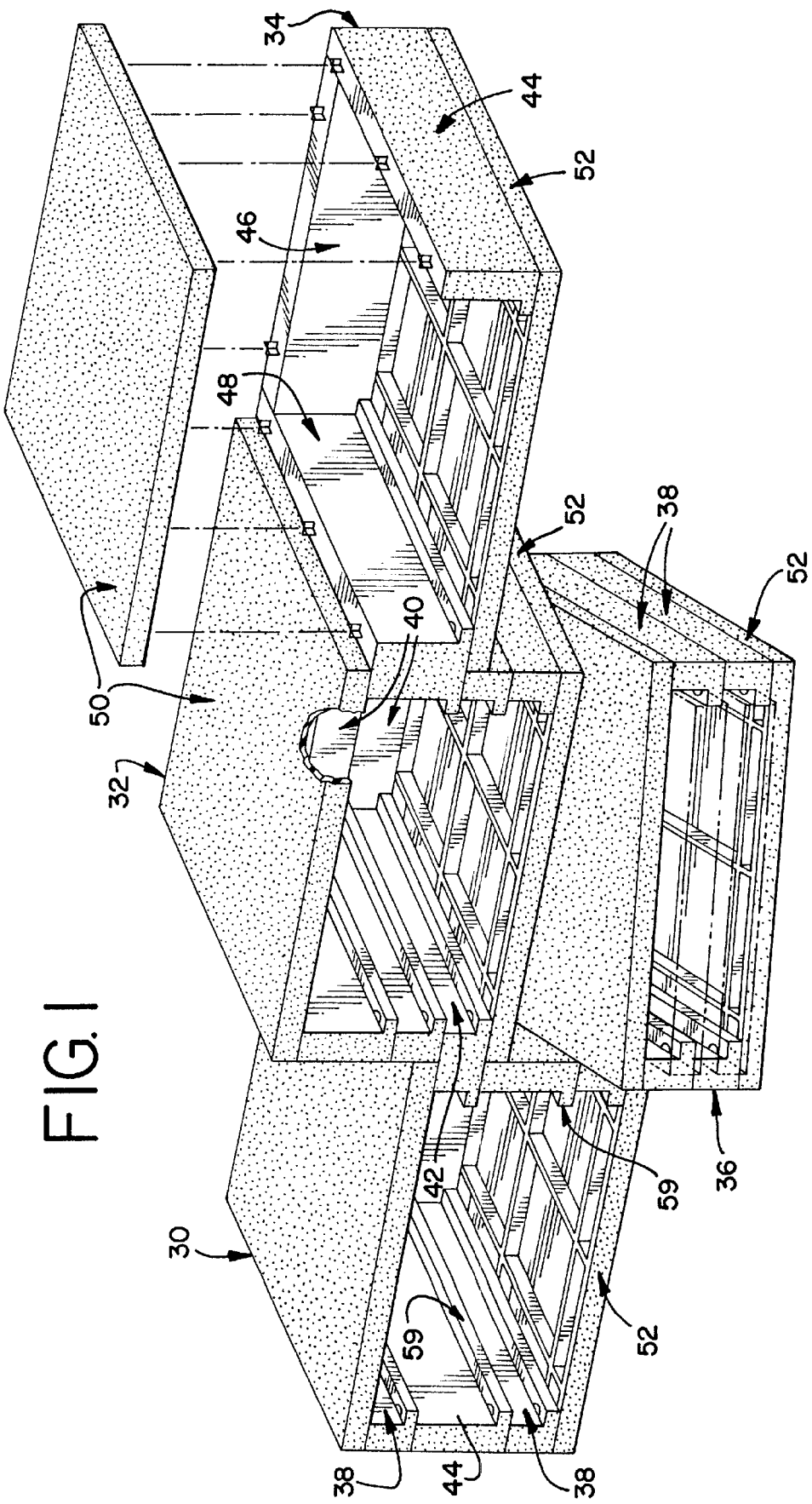
FIG. 1 is a somewhat diagrammatic perspective view of a plurality of towers that are constructed in accordance with the modular cabinet of the present invention and showing one part in exploded view and another part fragmentary to show underlying parts.
Figure 2:
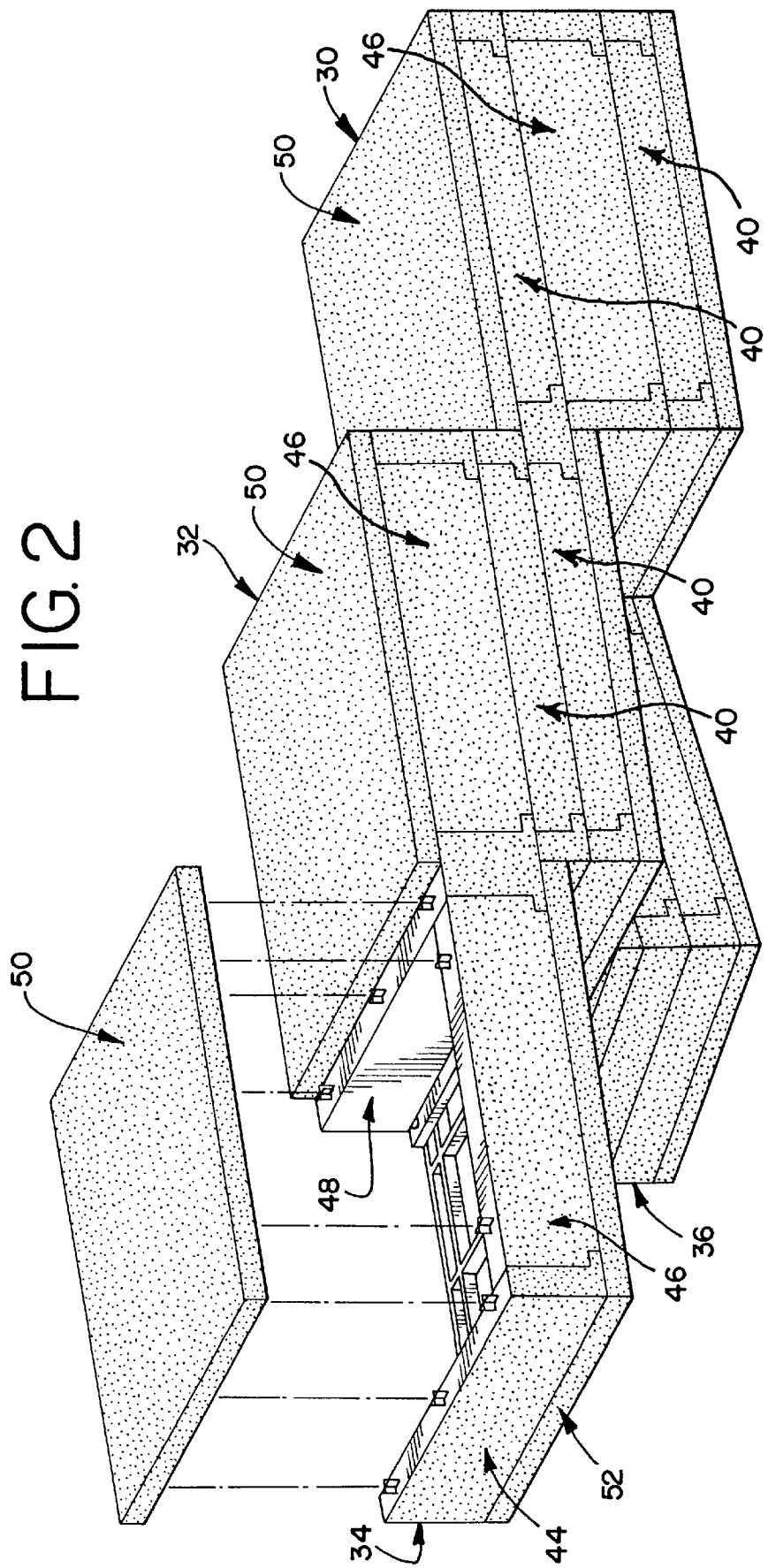
FIG. 2 is a rear perspective view of the towers shown in FIG. 1.
Figure 3:
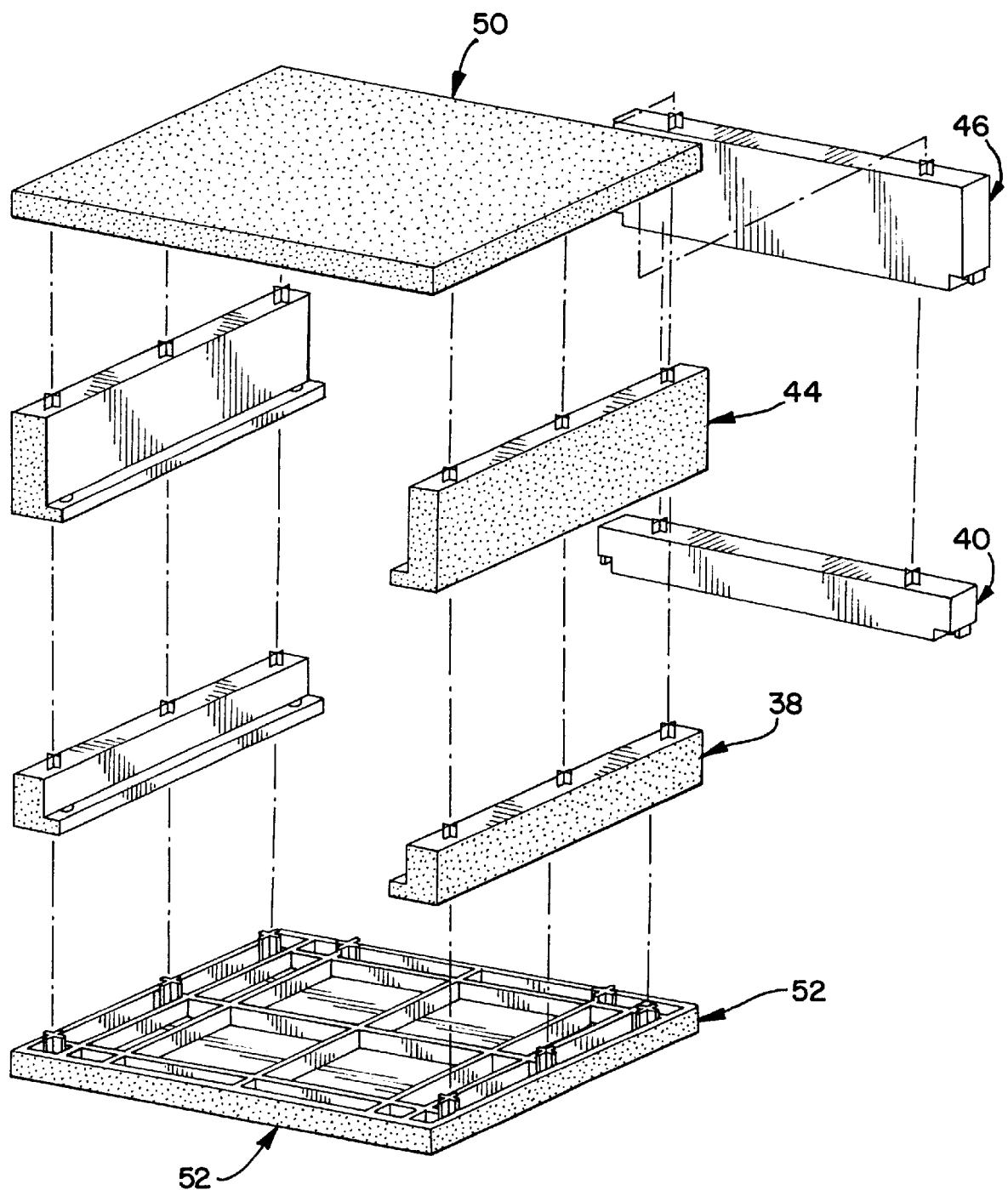
FIG. 3 is an exploded view of a tower with some parts shown diagrammatically to illustrate the invention and to illustrate the various sizes of the components.

Referring now to the drawings, and particularly to FIGS. 1, 2 and 3, it will be appreciated that the modular cabinet of the present invention may be made up of a number of members and may be structured into a plurality of towers in any suitable type of configured architecture according to the needs and desires of the user. For example, FIGS. 1 and 2 show the same arrangement wherein a first tower 30 is provided and configured to receive two single CDs and one double CD and includes an expander member for cantileverly supporting a second tower 32 extending laterally and upwardly which is configured to store two single CDs and one double CD. A third tower 34 is cantileverly supported laterally from the second tower 32 and illustrates a single unit for storing a double CD. Thus, the towers 30, 32 and 34 are interconnected with one another in a configuration including tower 30 as a base with towers 32 and 34 extending from the base. In order to appropriately support towers 32 and 34, a fourth tower 36 is provided as a single stand-alone unit and of a height that will fit under the tower 32 and on which the tower 32 may rest. Further, while towers 30, 32 and 34 are facing one direction, tower 36, not being connected to towers 30, 32 and 34, may be oriented in another direction and is angled relative to the directional placement of towers 30, 32 and 34 to provide a unique architecture for the user. Tower 36 is configured to receive two single CDs.

It will be appreciated that when reference is made to the storage of CDs, that is intended to mean storage of a CD received in a plastic jewel box of the usual type. It is well known that there are single and double jewel boxes, and a jewel box with a CD would be received by the modular storage cabinet.

While the height of towers 30 to 36 is such only to receive a few CDs, it will be appreciated that the height may be of any extent desired. For example, a tower could be made and configured so it would store one CD above the other of any number, such as five, ten, fifteen, or more CDs. It will further be appreciated that one of the towers would be a stand-up unit that would be supported on a desired surface such as a table. Other arrangements might include a pair of like towers spaced apart and interconnected by a central tower that is not of the same height as the two outer towers. It will be appreciated that the height of a tower may vary depending upon the desires of the user. In this respect, the modular storage cabinet of the invention may be custom configured by the user to best fit the user's needs and the environment in which the cabinet is to be used.

Further, it will be appreciated that once a user has purchased a kit including a number of different members and assembled the members into a configuration desired, that configuration may later be changed as the members may easily be disassembled and reassembled in a different configuration. Moreover, when it may be found that the capacity of the cabinet is full and additional capacity is desired, the user may obtain another kit of members and add on to the existing cabinet. The possibilities of configuration are innumerable and unlimited. As seen in FIG. 3, although the cabinet there is in exploded view, it will be appreciated that the parts when assembled together would provide a single stand-alone cabinet capable of storing a single CD and a double CD. The location of the double CD may be changed relative to the location of the single CD, as the location again is such that it may please the user. In all instances, the modular cabinet would have an open front for purposes of allowing the easy insertion of a single CD or double CD into place and also thereafter to restore it to use. It will be appreciated that there are times when only the jewel boxes will be stored in their respective slots as the CD will be in use.

Further, the modular cabinet of the present invention facilitates the organization of CD inventory and may also be used in audio rooms to store demonstration disks. Thus, the unit may not only be used personally in the home or at a business, but it may be used any place there is a need for storage of CDs and the desire to maintain them in organized fashion.

The modular cabinet of the present invention would normally be sold in kit form wherein the parts are disassembled so that the user may assemble the parts in a manner in which it is desired that the cabinet be configured. After a configuration has been made, it may be changed or expanded as desired where only a single or double CD space may be added or subtracted depending upon the desires of the user. Further, the configured cabinet may be such that it would go over an object, go under an object, or go around an object. While the modular cabinet is generally used to store the CDs in a horizontal position, it will be appreciated that a stand-alone configuration could be placed on one side and the CDs could be vertically arranged when inserted into their respective slots. With respect to the placing of one tower in cantileverly supported position relative to another tower, it will be appreciated that the second tower that is cantileverly supported may be moved up or down relative to the height of the first tower to provide the desired configuration or even reversed in direction so the open side of the second tower is facing in the opposite direction. Further, a second tower may be cantileverly supported off either side of a first tower that is a stand-alone tower.

The modular cabinet of the present invention can be made up from a plurality of members that are connected together, as shown in FIGS. 1 and 2. All of the members of the cabinet are illustrated for a total of eight members and which include, as shown in FIGS. 1 and 2, single side members 38, single height back members 40, single expander members 42, double side members 44, double back members 46, double expander members 48, top members 50, and bottom members 52. The side members, both single and double, and the expander members, both single and double, are interchangeable as to the side that they may be mounted on. For example, the side members may be mounted on either the left or the right side. The back member is reversible so that either side may be facing inwardly or outwardly relative to the cabinet. Thus, a back member may also be at the front or rear of a cabinet, or one or more back members may be at the front, while one or more may be at the rear. The top members may be reversed as to which edge faces forward or rearward, although the sides must be at one of the sides although they can be at either side.

With respect to the embodiment shown in FIG. 3, which is a single stand-alone unit, it only includes single side and back members, double side and back members, a top and a bottom. No expanders are used although it can be appreciated if there is desirability of expanding the capacity of this unit when it is assembled, a single or double expander may be substituted for either of the single or double side walls so that a further tower can be constructed adjacent to this tower, and which would be cantileverly supported by the first tower. In terms of height of the various members, the single side, single back, and single expanders are all of the same height. Similarly, the double side, the double back, and the double expanders are all of the same height. The double members are twice the height of the single members. The height of the top member is equal to the height of the bottom member and the collective height of both the top and bottom members is equal to the height of a single side, back or expander member. Therefore, it should be appreciated that an independent stand-alone tower fitting under a cantilevered tower would have one less CD space than the adjacent stand-alone tower supporting the cantilevered tower.

The members of the present invention that are usable to custom fabricate a modular CD storage cabinet are molded of a suitable plastic. Preferably, they are molded of a high-impact polystyrene. Each member includes reinforcing ribs that structurally strengthen the members so that they maintain their shape, and also so that when connected to other members, a rigid structure is configured capable of safely storing CDs, and also in order to enable another tower to be cantileverly supported from a first tower.

The single side members 38, as shown in FIGS. 6 to 8, include a horizontally extending top wall 54, parallel opposed end walls 55 and 56, an outside wall 57 extending parallel to an inside wall 58, and a rail 59 at the lower end of the inside wall 58. The rail is defined by a horizontal wall 60 and a vertical wall 61 and, as will be more clearly explained below, serves to support one edge of a CD jewel box. Thus, a jewel box is supported at opposite edges in a cabinet. Further, the side wall member includes three pins or pegs 62, 63 and 64 extending upwardly from the top wall 54 and three sockets 65, 66 and 67 in alignment with the pins and extending downwardly through the bottom of the side wall structure. While the pins 62–64 may take any suitable shape, they are preferably in the form of a cruciform when looking at them from the top or outer end, as seen in FIG. 6, and each includes a core 68 with a plurality of radially extending fins or ribs 69. In the cruciform shape, four fins are provided, the outer free edges of which are the contact edges for engaging a socket. From the outer free ends of the fins to their base where they are connected to the top wall, they are slightly tapered in a diverging fashion so that they will provide a good press-fit relation with a socket of another part. Similarly, the sockets 65–67 also have a slight taper toward the open end where it diverges somewhat so that they can easily receive a pin of another member. The pins are shorter than the sockets so that members can bottom against each other, and the pins while press-fitting with the sockets will not bottom in the sockets, but will tightly engage. Further, the semi-circular holes or sockets 70 and 71 are provided at adjacent ends in the horizontal wall 60 for receiving a locking tab from the back members, as will be explained further below.

As above explained, the outer surfaces of the side member 38 that would be exposed, which includes the outer surface of the outside wall 57 as well as the outer surfaces of the end walls 55 and 56, would be textured as illustrated by the stippling in FIGS. 1, 2 and 3 to provide a finish that is aesthetically pleasing. Because the side member 38 may be used on either side, it is symmetrical in form as to the placement of the pins, sockets and openings for the locking tabs. Thus, the side member can be used on either side of the tower to be constructed.

As seen most clearly in FIGS. 10 and 22, the locking tabs of the back member 40 are essentially a three-cornered tab 72 to fit in a semi-circular hole 70 of the side members, as will be further explained below.

The back members 40 include parallel opposed front and back walls 74 and 75 and opposed parallel end walls 76 and 77, all of which are interconnected together by a top wall 78. Projecting up from the top wall 78 are spaced apart mating pins 79 and 80 for mating in sockets of other back members or a top member vertically aligned with pins 79 and 80 and projecting from the underside of the top wall 78 are sockets 81, only one of which is illustrated in FIG. 10, which would mate with pins of other back members or a bottom member. Extending from each socket to the front and back wall are connecting ribs which together with the sockets function to reinforce the relationship between the front and back walls and structurally strengthen the member. Additionally, a central stiffening rib 82 likewise extends between the front and back walls, as well as being integral with the top wall 78 for further stiffening of the relationship between the front and back walls. Inasmuch as the placement of the pins 79 and 80 and the sockets 81, as well as the locking tabs 72, is centered between the front and back walls and the location of the pins and sockets along the top wall is symmetrical with the overall structure. The back member is reversible wherein the front wall may serve as a back wall, and the back wall may serve as a front wall. Thus, it does not matter as to how the back member is assembled with the side members as to orientation with respect to the ends and front and back sides. Again, the pins 79 and 80, when viewed from the end, are cruciform shaped as being the preferred shape of the pins.

At each end of the back member where the locking tabs 72 are located, a notch is formed for coacting with the rail 59 formed on the side members. The notch is indicated by the numeral 83 and is sized to fit in mating relation against the horizontal wall 59 and vertical wall 61 of the rail, as depicted in FIG. 22, and is also seen in FIG. 1. Further, the dimensions of the back member are such that when the back member is connected to a side member, the back wall 75 of the back member becomes flush with the associated end wall of the side member, as most clearly seen in FIG. 2. Further, the bottom edges of the back member front and back walls will be flush with the bottom edge of the vertical wall 61 of the rail, and further the top surface of the upper wall 78 of the back member will be flush with the top surface of the top wall 54 of the side member. Additionally, the relationship between the back member and a side member is that one is perpendicular to the other to provide a square corner. An arrow 84 is provided at each end of the back member along the upper surface of the top wall 78 as a visual reference to assist the user in assembling the back member with a side member wherein the side member also includes an arrow 85 which points the direction in which the back member is to be received. Thus, the arrows face each other to assist in assembly with respect to placement of the back member relative to the side members.

Figure 4:
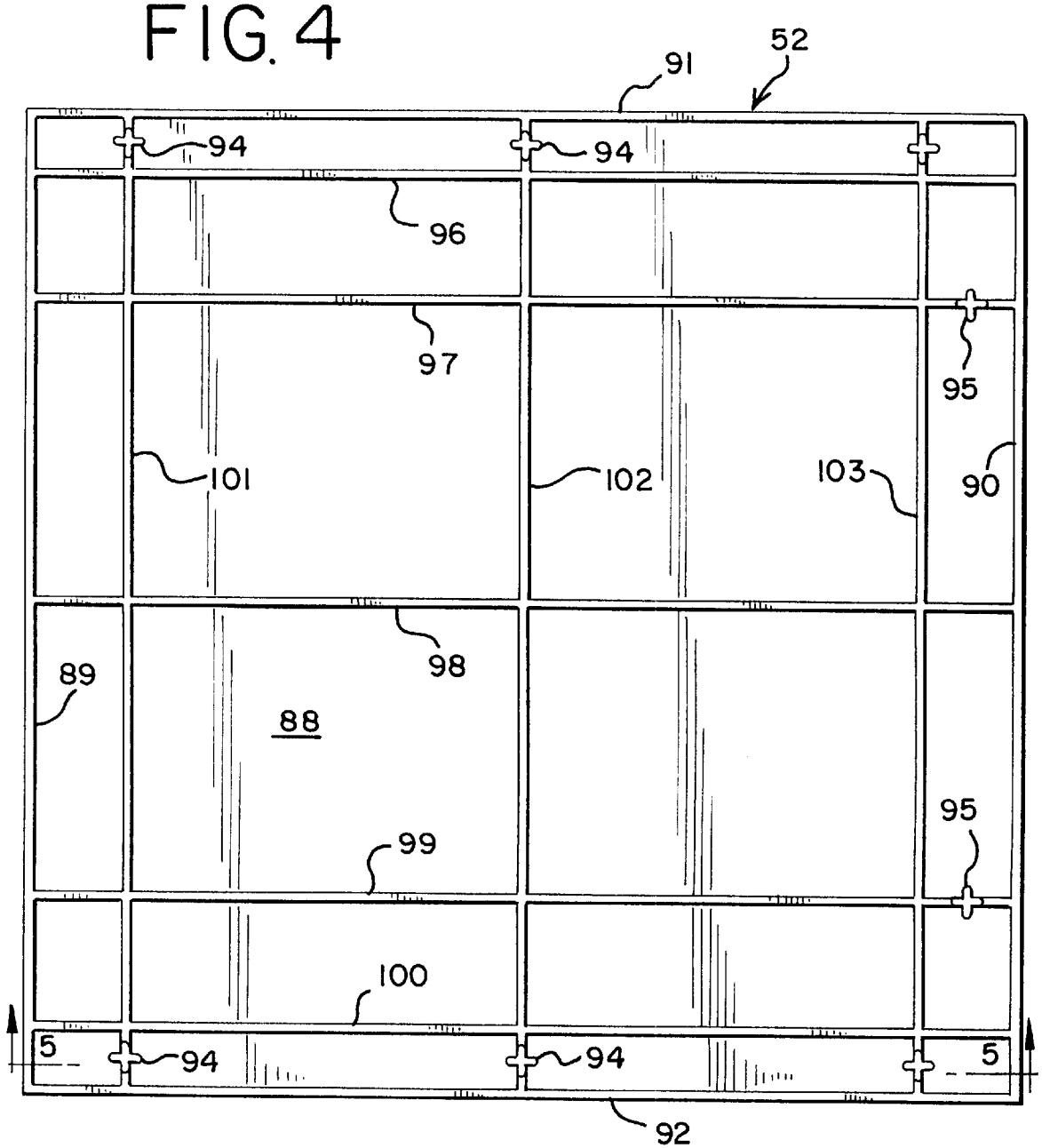
FIG. 4 is an inside or bottom plan view of the bottom member used in the modular cabinet of the present invention.
Figure 5:
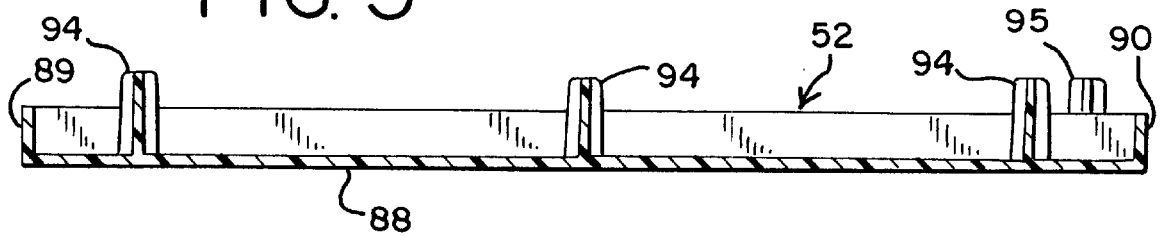
FIG. 5 is a transverse sectional view taken substantially along line 5—5 of FIG. 4.

Referring now to FIGS. 4 and 5, the bottom member 52 includes a bottom wall 88, opposed front and back walls 89 and 90, and opposed parallel side walls 91 and 92. The front and back walls are parallel to each other, the side walls are parallel to each other and therefore each of the side walls is in perpendicular relation to the front and back walls. Further, the front, back and side walls extend perpendicularly to the bottom wall 88. The side walls are slightly shorter than the front and back walls as to length. The sides are appropriately sized with respect to the side and back members and allow a CD jewel box to protrude slightly from the front opening of the cabinet once it is assembled so that it can be easily identified and easily gripped for insertion and removal. Protruding upwardly from the bottom wall 88 and above the upper edges of the front, back and side walls are pins 94 along each of the side walls and pins 95 along the back wall. The pins 94 are spaced apart so as to fit in the sockets 65–67 of the side members, while the pins 95 are spaced apart to fit into the sockets 81 of the back member. Thus, three pins are provided at opposite sides of the bottom member, while two are provided at the back of the bottom member. The length of the pins is sized so that they do not bottom in the sockets of the side and back members, so that the members, that is, the side and back members, will bottom on the bottom member when they are assembled together. Thus, the length of the pins that protrude above the bottom member side and front and back walls is less than the depth of the sockets in order to provide a proper closed relationship between the side and back members and the bottom when they are assembled. Again, the pins, when viewed from the end, are cruciform in shape as the preferred shape. In order to rigidify and reinforce the relationship between the front and back walls with the side walls and the bottom wall, reinforcing ribs are provided of the same depth as the side walls. Five reinforcing ribs 96, 97, 98, 99 and 100 extend between the front and back walls and of course also are integral with the bottom wall. Three reinforcing ribs 101, 102 and 103 extend between the side walls and also intersect with the front to back reinforcing ribs 96–100. Any suitable number of reinforcing ribs may be provided. The bottom member will be molded also in one piece so that all of the walls, reinforcing ribs, and pins are integral.

Figure 11:
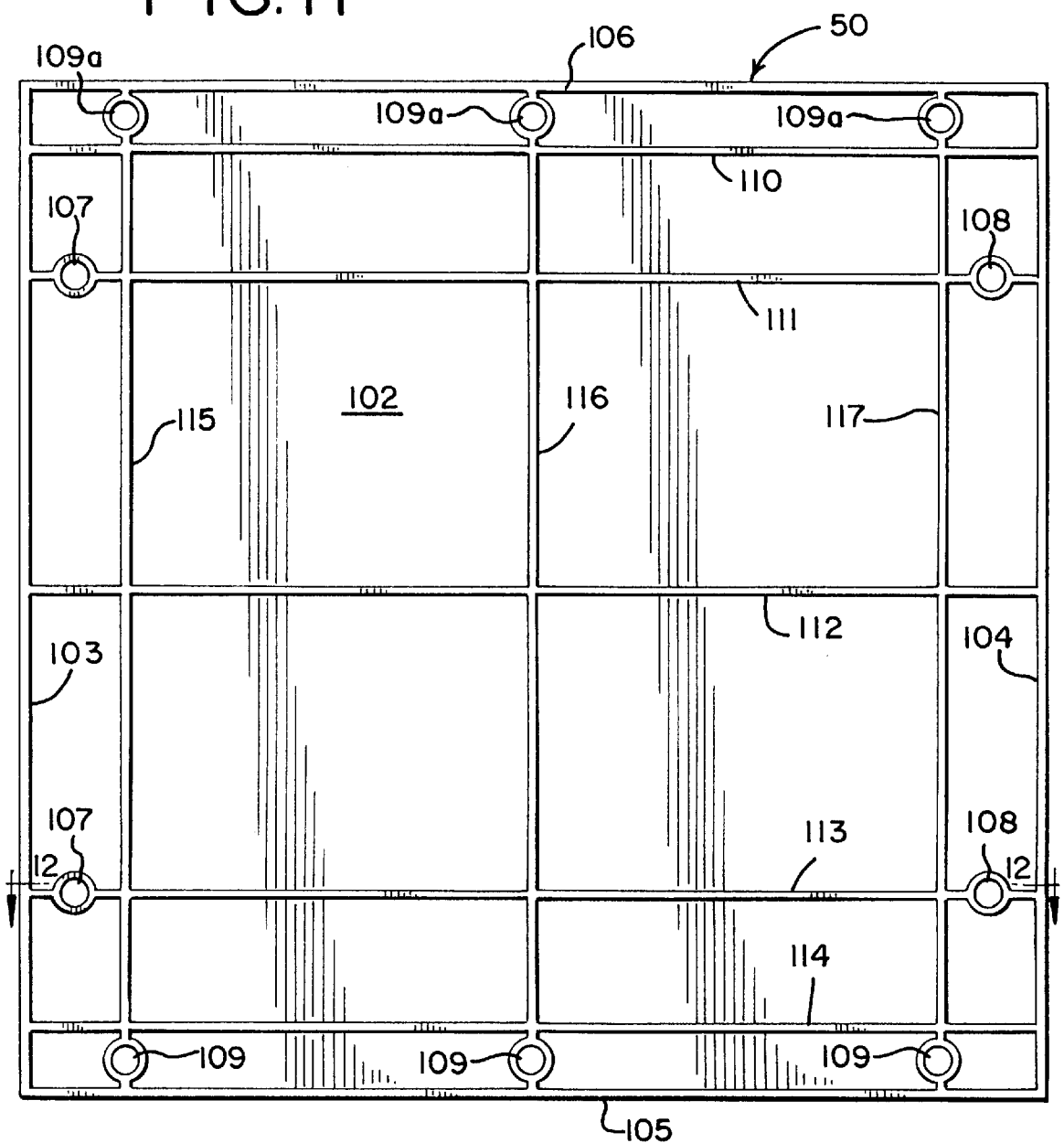
FIG. 11 is an inside plan or bottom plan view of the top member of the modular cabinet of the present invention.
Figure 12:
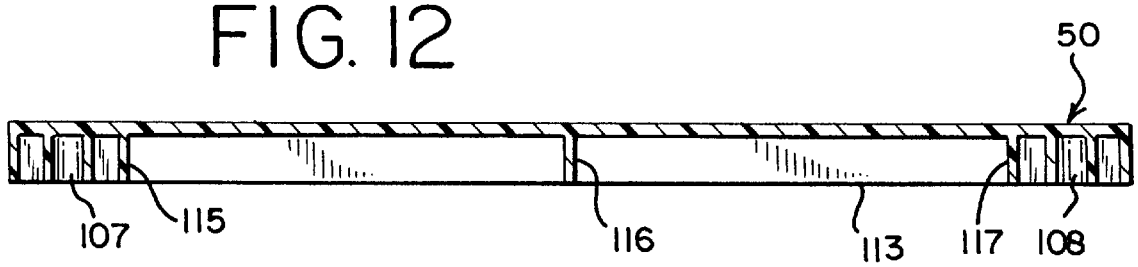
FIG. 12 is a transverse sectional view taken substantially along line 12—12 of FIG. 11.

The top member 50, as seen in FIGS. 11 and 12, includes a top wall 102, front and back walls 103 and 104 extending parallel to each other, and opposed side walls 105 and 106 extending parallel to each other. The side, front and back walls are integral with the top wall and the top member is also molded of plastic. Further, the relationship between the front, back and side walls is such that the side walls and front wall are perpendicular to each other as is the back wall and the side walls. Also, the height of the side, front and back walls is the same so that the height of the top member is uniform across its entire width both going front to back and side to side. The top member fits onto pins of the back and side members and accordingly includes sockets for fitting on the pins. A pair of sockets 107 is arranged against the front wall and a pair of sockets 108 is arranged adjacent the back wall. These sockets would mate with the pins 79 and 80 of the back member. Along the opposed side walls are three sockets 109 adjacent the side wall 105 and three sockets 109a adjacent the side wall 106. The side wall sockets would mate with the pins along the side members, and accordingly are so spaced apart to mate with the side member pins. Finally, front-to-back extending parallel reinforcing ribs 110, 111, 112, 113 and 114 add reinforcement to the top member as well as side-to-side extending reinforcing ribs 115, 116 and 117. The reinforcing ribs extend to the sockets and essentially beyond the sockets to the front, back and side walls, as shown in FIGS. 11 and 12. Inasmuch as the top member includes back member engaging sockets at both the front and back sides of the top member, the top member is also reversible, and it does not matter whether front wall 103 is at the front or back of the cabinet when it is assembled.

Referring now to FIGS. 13 to 16, the expander 42, which is a single expander, is shown in use between the tower 30 and the tower 32 in FIG. 1, in order to cantileverly support the tower 32 to the tower 30. The height of a single expander is equal to the height of a single side member.

The expander includes a top wall 119, parallel opposed side walls 120, and parallel opposed end walls 121. The end walls 121 extend the full height of the expander, while the side walls 120 extend down to the opposed rails 122. Each of the rails is defined by a horizontal wall 123 and a vertical wall 124. As already explained with respect to the side members, the rails serve to support the CD jewel boxes. Projecting upwardly from the top wall 119 are two rows of pins, there being three pins in each row like in a side member. One row includes pins 125 and the other row includes pins 126. Aligned with the pins and extending from the underside of the wall 119 are two rows of sockets. One row includes three sockets 127, and the other row includes three sockets 128. Dimensional arrangement of the pins and sockets is the same as that of the pins and sockets on the side members. The width of the expander is such that it can provide a rail in one tower and a rail in the other tower, as shown particularly in FIG. 1, where one rail of the expander 42 is provided in the tower 30 and another rail is provided in tower 32. As also seen particularly in FIG. 14, reinforcing ribs are provided along the sockets to provide reinforcing between the opposite walls as well as the top wall. At opposite ends of each of the rails, a semi-circular opening or socket is provided for receiving the locking tabs at the ends of the side members. With respect to the rails, the semi-circular openings or sockets 129 would receive the locking tabs of the back members. Thus, it can be seen that the single expander 42 will function very much like a single side member, except that it is sized so that it can cantileverly support another tower.

A double side member is shown in FIGS. 17 and 18 which other than to be of a substantially double height of a regularly side member is otherwise identical in that it includes a top wall 132, downwardly extending side walls 133 and 134, which are parallel to each other, opposed parallel extending end walls 135 and 136, and a rail 137. A row of three pins 138 extends from the upper surface of the top wall 132 and in alignment therewith and extending from the undersurface of the top wall 132 are sockets 139. The pins would have a cruciform shape as viewed from the ends, as the other pins of the other members. Finally, semi-circular sockets 140 would be provided at opposite ends of the rail 137. These sockets are for receiving the locking tabs of a back member.

A double back member is shown in FIG. 19 as 46 and would have the same elements as the single back member, except that it would be twice the height as the single back member and would be used in connection with double side members 44. Thus, the double back member 46 would include a top wall 142, opposed front and back walls 143, and end walls 144. A pair of pins 145 would extend upwardly from the top side of the top wall 142, while a pair of sockets 146 would extend in alignment with the pins and to the bottom of the back member. Locking tabs 147 would be provided in notches at the opposite ends of the back member and at the lower end of the lower corners of the back member, as in the single back member.

A double expander 48 is shown in FIGS. 20 and 21 and would have the same elements as in the single expander 42, except that it would be twice the height. Accordingly, the double expander would include a top wall 150, opposed front and back walls 151, opposed end walls 152, and opposed rails 153. A first row of pins 154 and a second row of pins 155 would be provided on the upper side of the top member 150 and aligned therewith and extending below would be sockets 156. Locking tab sockets 157 would be provided at the opposite ends of each of the rails 153 as in the single expander. The double expander, together with a double side member, as well as the double back member, would be used where it would be desired to store a double jewel box for two CDs.

As seen in FIG. 23, a double side member 44 is shown in seated position on a bottom 52 to illustrate how the socket of one member receives a pin of the other member, and how the top member is seated on the bottom member. As illustrated, the socket is deeper than the height of the pin. Therefore, the upper member will seat against the lower member, as illustrated in FIG. 23.

It can now be appreciated that all of the members are sized to fit one another and be assembled such as shown in the towers 30, 32 and 34 of FIGS. 1 and 2. The chosen height of a tower will depend upon the number of CDs to be stored and also whether there is to be desired storage for single or double CD jewel boxes. Additionally, one or more towers may be added to a tower that is self-supporting by using the expanders, wherein additional towers would be cantileverly supported relative to the first stand-alone tower as are towers 32 and 34. Further, a second free-standing unit can be employed such as the unit 36 as a single tower where it can be interfitted with respect to another tower, as illustrated in FIGS. 1 and 2. Such interfitting is possible because a top and bottom member collectively is equal in height to a single side member. Thus, two stand-alone towers, each having one or more cantilevered towers, can be positioned so that the cantilevered towers are interleaved with each other. Thus, any sort of architecture may be designed according to the desires of the user. Although the towers would usually be disposed so that the CD jewel boxes would be stored horizontally, a single tower may be placed on its side for storing boxes vertically.

It will be understood that modifications and variations may be effected without departing from the scope of the novel concepts of the present invention, but it is understood that this application is to be limited only by the scope of the appended claims.

I claim:

1. A modular compact disk jewel box storage cabinet comprising: a plurality of connectible members defining at least one tower which includes a bottom member, at least two opposed side members, a back member, and a top member, said side members extending between said top and bottom members, said members having inner walls and outer walls and being in one piece, said inner walls of said side members having support means extending therefrom on which a jewel box may be supported, all of said members when assembled thereby defining a vertically extending cabinet having a front opening and closed at the bottom, sides, back and top so that a jewel box may be inserted into or withdrawn from the front opening, means for connecting said members together including integral male pins and/or female sockets on each of said members to form a cabinet configuration, said pins and sockets being formed to press fit together and provide a rigid cabinet and being separable for changing the vertical dimension of the cabinet and/or to add one or more towers at the same or different levels in interconnected relation therewith.

2. The cabinet of claim 1, wherein the outer walls of the members are textured to provide a finished surface.

3. The cabinet of claim 1, wherein the side and back members include coacting interengaging means to lock the members together in right angle relation to each other.

4. The cabinet of claim 3, wherein said coacting means includes locking tabs at opposite ends of a back member mating in sockets in the adjacent ends of a side member and abutting surfaces of said member.

5. The cabinet of claim 1, wherein said inner support means include rails on which a jewel box may be supported at opposite edges.

6. The cabinet of claim 5, wherein the height of the side members are such as to accommodate a double jewel box.

7. The cabinet of claim 5, wherein the height of the side members are such as to accommodate a single jewel box.

8. The cabinet of claim 5, which further includes an expander in the form of connected side members defining inner walls having jewel box supporting rails for replacing a side member of a tower to add an adjacent tower.

9. The cabinet of claim 1, wherein the back members further include locking tabs at opposite ends thereof for mating in tab sockets provided in a side member to connect the side and back members together.

10. A modular compact disk jewel box storage cabinet comprising: a plurality of connectible members defining at least two towers with front openings which include a bottom member for each tower, a plurality of side members for each tower, a plurality of back members for each tower, a top member for each tower, at least one expander member interconnecting the towers and replacing side members of each tower, said bottom member including pins engageable in sockets of the side and back members to connect the bottom member to the side and back members and the side and back members including pins engageable in sockets in the top member to connect the top member to said side and back members, said back members further including locking tabs at opposite ends thereof for mating in tab sockets provided in the adjacent ends of the side members to connect the side and back members together, said side members and said expander member bridging between two towers and including inner walls having rails thereon for supporting jewel boxes, and said side and back members having mating pins and sockets to connect side members together in stacked relation and to connect back members together in stacked relation, all of said pins and sockets connecting together in press-fit relation and being separable for disassembly of the members.

11. A modular compact disk jewel box storage cabinet comprising: a plurality of connectible members defining at least one tower with a front opening which includes a bottom member, at least two opposed side members, a back member, and a top member, thereby defining a cabinet having a front opening so that a jewel box may be inserted into or withdrawn from said front opening, means for connecting said members together including male pins and/or female sockets on each of said members, said bottom member including pins engageable in sockets of the side and back members, said side and back members including pins engageable in sockets in the top member, said male pins including a plurality of elongated contact edges for engaging the female sockets, said contact edges being defined by ribs projecting substantially radially from a core, said pins and sockets being formed to press fit together and provide a rigid cabinet and being separable for changing their relationship.

12. The cabinet of claim 11, wherein the female sockets of the side and back members are slightly tapered.

13. The cabinet of claim 11, wherein the back members further include locking tabs at opposite ends thereof for mating in tab sockets provided in a side member to connect the side and back members together.

14. The cabinet of claim 11, wherein the ribs define a cruciform as seen from the outer ends thereof.

15. The cabinet of claim 11, wherein the contact edges collectively include a slight taper.

16. A modular compact disk jewel box storage cabinet comprising: a plurality of connectible members defining at least two towers with front openings which include a bottom member for each tower, a plurality of side members for each tower, a plurality of back members for each tower, a top member for each tower, said side members extending between said bottom and top members, and at least one expander member interconnecting the towers and replacing side members of each tower, said expander member bridging between two towers and including inner walls having rails thereon for supporting jewel boxes, and means connecting the members together including integral mating male pins and female sockets formed to provide press-fit connections, said expander member including first and second sets of integral pins and sockets, one of said sets being for one of the towers and the other of said sets being for the other of the towers, said members being formed for assembly and disassembly.

17. The cabinet of claim 16, wherein one of said towers is self-supporting on a substantially flat surface, and the other of said towers is cantileverly supported by the self-supporting tower.

18. The cabinet of claim 16, wherein the height of said side members, back members and expander members is such as to accommodate single jewel boxes.

19. The cabinet of claim 16, wherein the height of said side members, back members and expander members is such as to accommodate double jewel boxes.

20. The cabinet of claim 16, wherein the height of said side members, back members and expander members is such as to accommodate both single and double jewel boxes.

21. A modular compact disk storage cabinet kit for storing compact disks in jewel boxes comprising: a plurality of connectible members for erecting one or more towers, each tower having an opening for the insertion or withdrawal of compact disk jewel boxes, wherein the towers may be interconnected such that one tower may be cantileverly supported by another tower, said members including a bottom member to close the bottom of a tower, side members to close the sides of a tower, back members to close the back of a tower, top members to close the top of a tower, and expander members to connect two towers together, said side and expander members extending between top and bottom members, said members having integral mating pins and/or sockets wherein the pins and sockets of members are sized to join together in press-fit relation to interconnect the members and provide a rigid cabinet and be separable for changing their relationship.

22. The kit of claim 21, wherein the side, back and expander members are sized to accommodate a single jewel box.

23. The kit of claim 21, wherein the side, back and expander members are sized to accommodate a double jewel box.

24. The kit of claim 21, wherein said back and expander members are reversible.

25. The kit of claim 21, wherein said side and back members include coacting means to lock said members together in right angle relation to each other.

26. The kit of claim 25, wherein said pins include a plurality of radially arranged ribs extending from a core defining longitudinally extending contact edges tapered to provide a press-fit with a socket.

27. The kit of claim 26, wherein the sockets receiving pins are slightly tapered.

28. The kit of claim 27, wherein the back and expander members are configured to be reversible.

29. The kit of claim 28, wherein the outer surfaces of said members are textured.

30. The kit of claim 29, wherein rails are provided on the inner side of the side walls to support the edge portions of the compact disk jewel boxes.

* * * * *